United States Patent
Costa et al.

(10) Patent No.: US 11,281,599 B2
(45) Date of Patent: Mar. 22, 2022

(54) SHARED PERIPHERAL DEVICES

(71) Applicant: Hewlett-Packard Development Company, L.P., Spring, TX (US)

(72) Inventors: Carlos Haas Costa, Palo Alto, CA (US); Donald Gonzalez, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/049,323

(22) PCT Filed: Oct. 10, 2018

(86) PCT No.: PCT/US2018/055248
§ 371 (c)(1),
(2) Date: Oct. 20, 2020

(87) PCT Pub. No.: WO2020/076313
PCT Pub. Date: Apr. 16, 2020

(65) Prior Publication Data
US 2021/0248091 A1    Aug. 12, 2021

(51) Int. Cl.
*G06F 13/12*    (2006.01)

(52) U.S. Cl.
CPC .......... *G06F 13/122* (2013.01); *G06F 13/126* (2013.01)

(58) Field of Classification Search
CPC .............................. G06F 13/122; G06F 13/126
See application file for complete search history.

(56) References Cited

U.S. PATENT DOCUMENTS

| | | | |
|---|---|---|---|
| 8,458,369 B2 | 6/2013 | Liao et al. | |
| 9,164,602 B2 | 10/2015 | Yeh et al. | |
| 9,396,139 B2 | 7/2016 | Chandler et al. | |
| 9,396,147 B1 | 7/2016 | Wieland et al. | |
| 2007/0053520 A1* | 3/2007 | Eckleder | H04L 9/0833 380/278 |
| 2008/0091858 A1* | 4/2008 | Zhang | G09G 5/006 710/72 |
| 2012/0162058 A1* | 6/2012 | Davis | G06F 3/1438 345/156 |
| 2012/0166621 A1* | 6/2012 | Sharma | H04L 41/042 709/224 |
| 2014/0281109 A1* | 9/2014 | Trethewey | G06F 13/126 710/313 |
| 2016/0371511 A1* | 12/2016 | Balducci | G06F 21/83 |

FOREIGN PATENT DOCUMENTS

WO    WO-2017037327    3/2017

* cited by examiner

*Primary Examiner* — Henry Tsai
*Assistant Examiner* — John B Roche
(74) *Attorney, Agent, or Firm* — Fabian VanCott

(57) ABSTRACT

A peripheral device of a computing device may include a processor; a sharing module to, upon execution of the processor, allow the peripheral device to be shared with an external computing device over a network; and a communication module to, upon execution of the processor: provide data from the peripheral device to a peripheral device hub module of a computing device; and provide communication by the peripheral device with the external computing device.

20 Claims, 3 Drawing Sheets

SHARED PERIPHERAL DEVICES

BACKGROUND

Computing devices and other electronics have become ubiquitous in modern life. An increasing number of electronic devices such as televisions, virtual assistant devices, and mobile computing devices, among others, are implementing or are made capable of implementing certain peripheral devices. These peripheral devices may include mice, keyboards, external data storage devices, and extended display devices among other types of peripheral devices.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
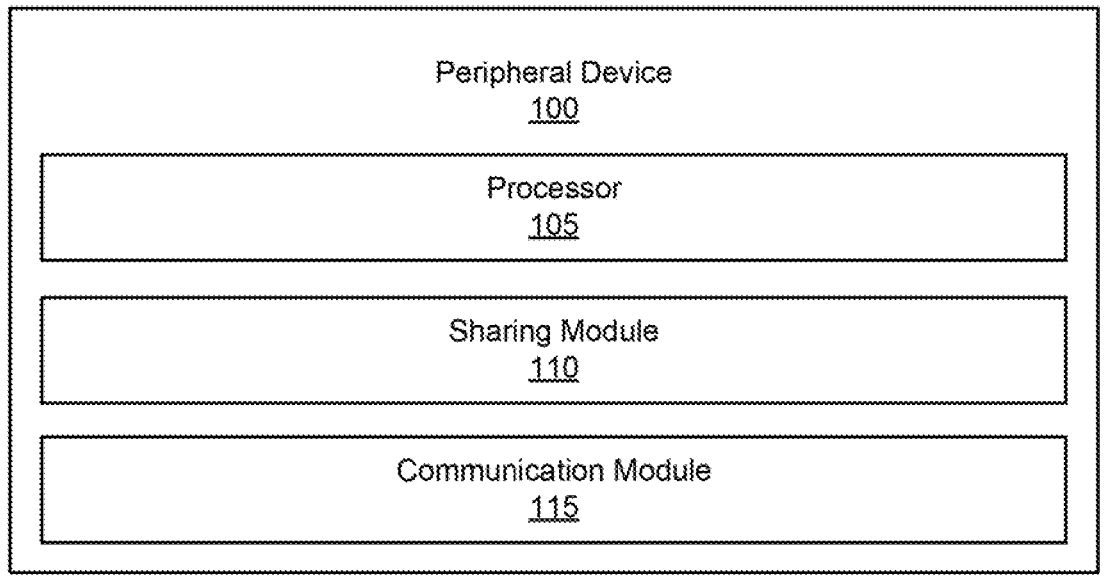
FIG. 1 is a block diagram of a peripheral device of a computing device according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Computing devices may include a number of peripheral devices that allow a user to interact with the computing device. In some examples, these peripheral devices may be wirelessly and communicatively coupled to the computing device. This wireless communication between the computing device and the peripheral devices may be accomplished using a wireless technology such as Bluetooth® developed by the Bluetooth Special Interest Group. Other types of wireless communication protocols may be made, however, for sake of simplicity in description, the Bluetooth protocol will be used as an example in the present specification. However, the present specification contemplates the use of these other types of wireless communication protocols.

The wireless coupling of the peripheral devices to the computing device may be accomplished by broadcasting a communication request from the computing device and allowing the peripheral device to be coupled to the computing device via, for example, a user selecting an option to allow the peripheral device to be communicatively coupled to the computing device. After being coupled, the peripheral device may interact with drivers executed by a processor of the computing device in order to add functionality to the computing device or otherwise provide ease of interaction with the computing device.

However, once connected (the term "paired" may be used in relation to using Bluetooth) the peripheral device remains connected to the computing device until the connection is deliberately severed. When the peripheral device is "unpaired" or disconnected with the computing device, it may be used with other devices that also have the capability of and executable program code to pair the peripheral device to itself. This process, however, eliminates the previous computing device's ability to, again, pair with the peripheral device. When the peripheral device is unpaired with the second computing device, the previous computing device pair the peripheral device to itself again. This process of pairing and unpairing the peripheral device to one of a multiplicity of computing devices may involve user interactions comprising a multiplicity of sub-processes.

The present specification describes a peripheral device and method of rendering a peripheral device independent from a computing device. This may be in contrast to computing systems where computing devices present tightly coupled hardware connections to their peripheral devices. The peripheral device described herein may, therefore, enhance a users experience by making use of a sharing module in a peripheral device that, when executed by a processor, provides for a peripheral device to be shared with external computing devices through selective decoupling of these devices from the computing device. Such sharing of peripheral devices by a computing device allow for a compartmentalized, but coherent, exposure of the many peripheral devices of a, so far, monolithic computing device, to be exposed as independent, but connectable entities to other computing devices thereby adding new features and enhancing user experience with the computing devices involved.

The present specification describes a peripheral device of a computing device that includes a processor; a sharing module to, upon execution of the processor, allow the peripheral device to be shared with an external computing device over a network; and a communication module to, upon execution of the processor: provide data from the peripheral device to a peripheral device hub module of a computing device; and provide communication by the peripheral device with the external computing device The present specification also describes a computing system, that includes a processor; and a peripheral device, that includes a peripheral device processor; and a sharing module to, upon execution of the peripheral device processor, allow the peripheral device to transfer data over a network; and a peripheral communication module for communication by the peripheral device with an external computing device; and a network adapter for commination between the peripheral device and a peripheral device hub module of the computing device.

The present specification further describes a method of sharing a peripheral device of a computing device, including, with a processor of the peripheral device: executing a sharing module to allow the peripheral device to transfer data over a network to an external computing device; and transferring data to the computing device indicating the sharing status of the peripheral device with an external computing device.

Turning now to the figures, FIG. 1 is a block diagram of a peripheral device (100) of a computing device according to an example of the principles described herein. The peripheral device (100) may be any device that provides input to and/or receives output from a processor of a computing device. Additionally, the peripheral device (100) may be either physically distinct from, for example, a computing device or formed within a housing of the computing device. Consequently, the present specification contemplates that, in some examples, a peripheral device (100) includes a web cam, a keyboard, and an internal memory device, among others peripheral devices that are physically formed within a housing of a computing device.

The peripheral device (100) may include a processor (105). The processor (105) may access and execute any computer readable program code as described herein. By way of example, the processor (105) may execute a sharing module (110) to allow the peripheral device (100) to be shared over a network to an external computing device and transfer data to the computing device indicating the sharing status of the peripheral device with an external computing device as described herein. In an example, the processor (105) of the peripheral device (100) may share in the execution of computer readable program code with other processing devices such as a processor associated with a computing device the peripheral device (100) is or will provide input to or receive output from as described herein.

As mentioned herein, the peripheral device (100) may include a sharing module (110). The sharing module (110) may, in an example, include executable program code that may be executed by the processor (105) of the peripheral device (100). In an example, the sharing module (110) may be an application specific integrated circuit (ASIC) that, when accessed by the processor (105), performs the functions described herein. Whether the sharing module (110) is in the form of computer readable program code or physically as an ASIC, the sharing module (110) may allow the peripheral device (100) to be shared with an external computing device over a network. This sharing of the peripheral device (100) may include a number of processes that allows input from the peripheral device (100) and/or output to the peripheral device (100) to be directed to or received from an external computing device. As such, in an example, the peripheral device (100) may be computer readable program code that, when executed by the processor (105), overrides control of the peripheral device (100) from the computing device and allows the processor (105) of the peripheral device (100) to communicatively couple the peripheral device (100) to an external computing device. In some examples, the computer readable program code may instruct a processor of the computing device to switch the peripheral device (100) from a user mode to a supervisor mode thereby allowing the sharing of the peripheral device (100) with an external computing device. In an example, the peripheral device (100) may indicate to the processor of the computing device that the peripheral device (100) is still present but that information will, at least temporarily, not be received from the peripheral device (100). Other processes may be implemented to provide the processor (105) of the peripheral device (100) with the control parameters to initiate communication with an external computing device. The present specification contemplates these other processes.

During a sharing process, the processor (105) of the peripheral device (100) may provide data to a processor of a computing device indicating that the peripheral device (100) is currently providing input to and/or receiving output from an external computing device. This data may include any signals to the processor of the computing device to disconnect the peripheral device (100) from communication with the computing device as described herein. In this example, the disconnection of the communication between the peripheral device (100) may be accompanied with information regarding an external computing device the peripheral device (100) is being communicatively coupled to.

In the example where the peripheral device (100) is communicatively coupled to the computing device via a Bluetooth® wireless communication protocol, the sharing module (110) of the peripheral device (100) may send signals to the processor of the computing device indicating that the peripheral device (100) is no longer going to be receiving output from and/or sending input to the computing device. This may be referred to as the peripheral device (100) being "disconnected" from the computing device. However, in this example, the disconnected peripheral device (100) may still be detectable by the computing device as its peripheral device (100). In any example presented herein, the peripheral device (100) may provide, via the sharing module (110), data descriptive of the transmission and receipt of data, data descriptive of the peripheral device (100), link addresses associated with the peripheral device (100), authentication data to disconnect and/or reconnect the peripheral device (100) with the computing device or external computing device, and negotiation data descriptive of a connection establishment between the peripheral device (100) and the computing device or external computing device, among other data. In a specific example, the peripheral device (100) may provide data to a processor of a computing device indicating which among the computing device or any other external computing device the peripheral device (100) is communicating with as well as a descriptor of the external computing device. In some examples, the peripheral device (100) may continually provided data, via the sharing module (110), to a processor of a computing device descriptive of what external computing device the peripheral device (100) is currently connected to and in communication with.

In the example where the peripheral device (100) is physically placed within a housing of a computing device, the sharing module (110) of the peripheral device (100) may include any number of wired connections that provide communication between the processor (105) of the peripheral device (100) and the processor of the computing device. As described herein, the processor (105) may execute computer readable program code that overrides the computing device's control of the peripheral device (100) allowing the peripheral device (100) to operate independently of the computing device.

The peripheral device (100) may include a communication module (115). The communication module (115) may allow communication of the peripheral device (100) to other devices including the computing device and any external computing device. The type of communication and, in turn, the type of data provided to these devices by the peripheral device (100) via the communication module (115) may vary based on the type of device. In an example, the communication module (115) may provide data from the peripheral device (100) to a peripheral device hub module executed by a processor of the computing device. The peripheral device hub module may receive the data from the communication module (115) of the peripheral device (100) that describes the sharing status of the peripheral device (100) with external computing devices. In this example, the peripheral device hub module may execute computer program code that presents to a user, visually, the status of the peripheral device (100) or other peripheral devices (100) being shared. The visual status, in an example, may include an image presented on a display device of the computing device. In an example, the visual status may include a light-emitting diode (LED) present on a hard key used to share the peripheral device (100) with an external computing device. The LED may provide a visual indication to the user of the shared or sharing states of the peripheral device (100) by illumination of the LED. color of the LED, flashing of the LED or combinations thereof.

In an example, the peripheral device (100) may operate independently of the processor of the computing device when communicative coupled to an external computing device. Consequently, the communication module (115) of the peripheral device (100) may provide for any output to the external computing device or receive any input from the external computing device. In order to accomplish this, the communication module (115) may encapsulate any input data for transmission to the external computing device. In this example, the encapsulation of the output data from the peripheral device (100) by the communication module (115) may include adding headers to each key output from the peripheral device (100) to the external computing device. In an example, the peripheral device (100) may include an encapsulation module In an example, when the peripheral device (100) has initiated, communication with the external computing device, the processor of the computing device may operate at a low power state. The low power state may reduce the heat and power consumption of the computing device while its resource, the peripheral device (100), is interacting with another external computing device.

Figure 2:
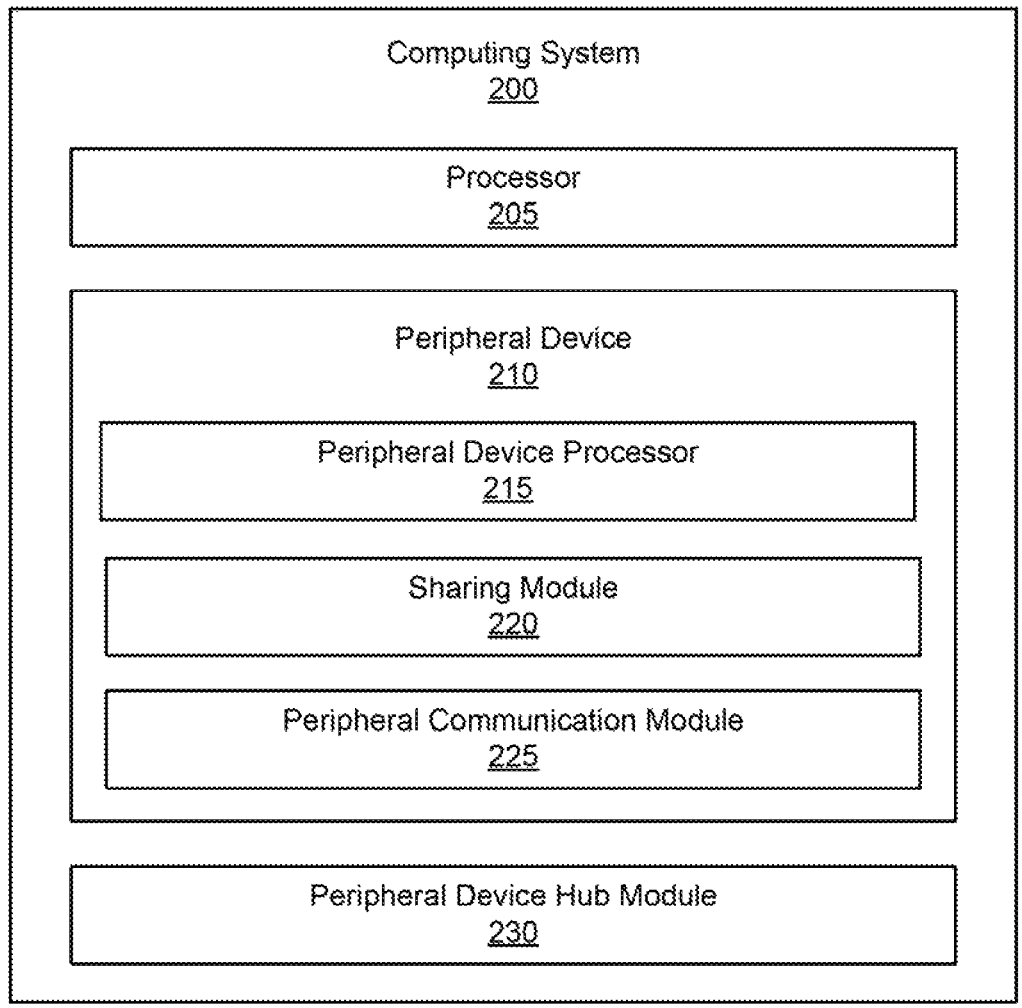
FIG. 2 is a block diagram of a computing system according to an example of the principles described herein.

FIG. 2 is a block diagram of a computing system (200) according to an example of the principles described herein. The computing system (200) may include a processor (205). The processor (205) may communicate, either wirelessly or via a wired connection, with a peripheral device processor (215). Communication between the processor (205) and the peripheral device processor (215) of a peripheral device (210) may include, apart from input from and output to the peripheral device (210), data descriptive of a sharing status of the peripheral device (210) with an external computing device; and data descriptive of an external computing device the peripheral device (210) is in communication with; among other types of data described herein. With this information, the processor (205) may provide, via a graphical user interface, details regarding the sharing status of the peripheral device processor (215).

During operation, the processor (205) may further receive from the peripheral device processor (215) of the peripheral device (210) signals indicating that the peripheral device (210) is to be shared with an external computing device. This signal may be processed by the processor (205) of the computing system (200) that changes the peripheral device (210) into an independent peripheral device that has authorization to communicatively couple to an external computing device. In an example, the peripheral device processor (215) may request that the peripheral device (210) be granted supervisory access to allow the peripheral device (210) to control which computing device to provide output to or receive input from.

The peripheral device (210) may further include a sharing module (220) and a peripheral communication module (225). As described herein, the sharing module (220) may upon execution of the peripheral device processor (215), allow the peripheral device (210) to be shared with an external computing device over a network. The peripheral communication module (225) may provide data from the peripheral device (210) and the peripheral device hub module (230) of the computing system (200) and provide communication by the peripheral device (210) with the external computing device.

The computing system (200) may be any type of computing device including servers, desktop computers, laptop computers, personal digital assistants (PDAs), mobile devices, smartphones, gaming systems, and tablets, among other computing devices. The computing system (200) may be utilized in any data processing scenario including, stand-alone hardware, mobile applications, through a computing network, or combinations thereof. Further, the computing system (200) may be used in a computing network, a public cloud network, a private cloud network, a hybrid cloud network, other forms of networks, or combinations thereof.

In an example, the computing system (200) may include various hardware components. Among these hardware components may be a number of processors (205), a number of data storage devices, a number of peripheral device adapters for each peripheral device (210), and a number of network adapters. These hardware components may be interconnected through the use of a number of busses and/or network connections. In one example, the processor (205), data storage device, peripheral device adapters, and network adapter may be communicatively coupled via a bus.

The processor (205) may include the hardware architecture to retrieve executable code from the data storage device and execute the executable code. The executable code may, when executed by the processor (205), cause the processor (205) to implement at least the functionality of executing a sharing module to allow the peripheral device (210) to be shared over a network to an external computing device and transferring data to the computing system (200) indicating the sharing status of the peripheral device with an external computing device, according to the methods of the present specification described herein. In the course of executing code, the processor (205) may receive input from and provide output to a number of the remaining hardware units.

The data storage device may store data such as executable program code that is executed by the processor (205) or other processing device. The data storage device may specifically store computer code representing a number of applications that the processor (205) executes to implement at least the functionality described herein. The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processor may boot from Read Only Memory (ROM), maintain nonvolatile storage in the Hard Disk Drive (HDD) memory, and execute program code stored in Random Access Memory (RAM).

The data storage device may comprise a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The remaining hardware adapters in the computing system (200) enable the processor (205) to interface with various other hardware elements, external and internal to the computing system (200). For example, the peripheral device adapters may provide an interface to input/output devices, such as, for example, display device, a mouse, a keyboard, and an internal data storage device, among others. The peripheral device adapters may also provide access to other external devices such as an external storage device, a number of network devices such as, for example, servers, switches, and routers, client devices, other types of computing devices, and combinations thereof.

The display device may be provided to allow a user of the computing system (200) to interact with and implement the functionality of the computing system (200). The peripheral device adapters may also create an interface between the processor (205) and the display device, a printer, or other media output devices as peripheral devices (210). The network adapter may provide an interface to other computing devices within, for example, a network, thereby enabling the transmission of data between the computing system (200) and other devices located within the network. The display device may also provide, as described herein, information to a user of a status of the shared state of the peripheral device (210). In this example, a user may access a desktop icon, a status bar or other type of tool to determine such as status.

Figure 3:
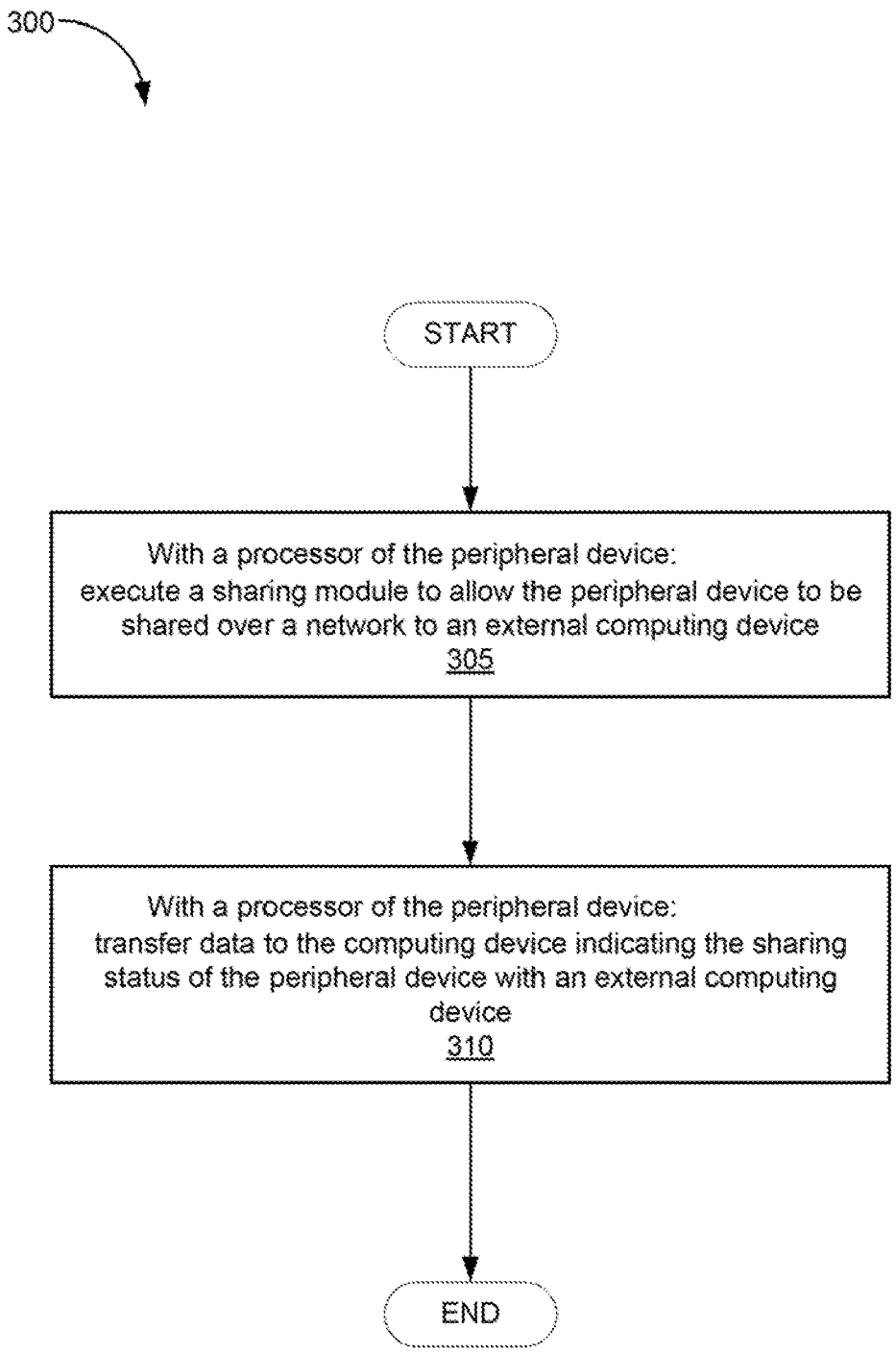
FIG. 3 is a flowchart showing a method of sharing a peripheral device of a computing device according to an example of the principles described herein.

FIG. 3 is a flowchart showing a method (300) of sharing a peripheral device (210) of a computing device according to an example of the principles described herein. The method (300) may include, with a processor (215) of a peripheral device (210), executing (305) a sharing module (220) to allow the peripheral device (210) to be shared over a network to an external computing device. As described herein, the sharing module (220) may send any number of signals and data to a processor (205) of the computing device so as to grant the peripheral device (210) with the ability to share its resources with the external computing device.

The method (300) may continue with the processor (215) of the peripheral device (210) transferring (310) data to the computing device indicating the sharing status of the peripheral device (210) with an external computing device. This data may include information about the type and name of the external computing device. This specific data may be used by the computing device to produce, on a graphical user interface, the sharing status of the peripheral device (210) to the user.

In any example, the processor (U215) of the peripheral device (210) may provide signals to the processor (205) of the computing system (200) indicating that the peripheral device (210) is to be providing data to the computing system (200) or otherwise is to be reassociated with the computing system (200) again. In any example, the association of the peripheral device (210) with an external computing device and the reassociation of the peripheral device (210) with the computing system (200) may completed any number of times so that a user may interact with multiple computing devices with the peripheral devices.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (205) of the computing system (200) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

In a specific example, via implementation of the method (300) described herein, if a first device is sharing its screen with the computing device, the microphone audio, keyboard and mouse from of the computing device can be automatically directed to the first device. This allows a user to control the first device remotely by voice and with the first device's display device in an off state. The mouse focus may also be based on mouse coordinates relative to different devices and may indicate the keyboard focus or destination of the microphone's audio. Indeed, any arrangement of any of the resources (i.e., peripheral devices) of the computing device may be used to interact with any number of other external computing devices providing a myriad of input and output options for the user.

The specification and figures describe a system and method for sharing peripheral devices of a computing device with other external computing devices. Television devices, game consoles, computing devices, mobile computing devices, and many other devices implement protocols allowing peripheral devices to control them and provide content and/or data. These peripheral devices such as wireless keyboards and mice, video casting protocols, wireless microphones, headsets, among others. The present methods, however, allows a compartmentalized, but coherent, exposure of the many peripheral devices of a, so far, monolithic computing device, to be exposed as independent, but connected to the computing device. This adds new features and functionality to the peripheral devices and external computing devices thereby enhancing a user experience with these devices. Since the peripheral devices continue to be connected in the computing device, a centralized, secure and efficient management of these connections can also be implemented. Additionally, the computing device may provide a user with real-time information as to if and with what external computing device the peripheral device is communicating with. Knowing this information allows a user to continue interacting, via the peripheral device, with the external computing device or reassociate the peripheral device with the computing device.

The preceding description has been presented to illustrate and describe examples of the principles described. This description is not intended to be exhaustive or to limit these principles to any precise form disclosed. Many modifications and variations are possible in light of the above teaching.

What is claimed is:

1. A peripheral device of a computing device, comprising:
a processor;
a sharing module to, upon execution of the processor, allow the peripheral device which is operable by the computing device to be shared and operably connected with an external computing device over a network; and
a communication module to, upon execution of the processor:
provide data from the peripheral device to a peripheral device hub module of the computing device to inactivate operation of the peripheral device by the computing device, while maintaining communication with the computing device, and notify the computing device that the peripheral device will subsequently be operated by the external computing device; and
provide communication by the peripheral device with the external computing device.

2. The peripheral device of claim 1, wherein the peripheral device is physically within a housing of the computing device.

3. The peripheral device of claim 1, wherein the peripheral device communicates with the peripheral device hub module to request a switch from a user mode in which the peripheral device is used by the computing device to a supervisor mode in which the peripheral device is to control which computing device operates the peripheral device.

4. The peripheral device of claim 1, wherein the peripheral device operates independently of a processor of the computing device allowing the peripheral device to be selectively communicatively coupled to the external computing device.

5. The peripheral device of claim 1, wherein the peripheral device is associated with a light-emitting diode (LED) to indicate a sharing state of the peripheral device with the external computing device.

6. The peripheral device of claim 5, wherein the LED provides a visual indication to the user of the sharing state of the peripheral device by:
illumination of the LED;
color of the LED;
flashing of the LED;
or combinations thereof.

7. The peripheral device of claim 1, comprising a data input encapsulation module to encapsulate any data from the peripheral device to be sent to the external computing device using a header directing the data from the peripheral device to the external computing device.

8. The peripheral device of claim 1, wherein the peripheral device sends data descriptive of a profile of the peripheral device to the peripheral device hub module.

9. The peripheral device of claim 1, wherein the communication module is to indicate to the computing device that the peripheral device is still present but will not be sending input data to the computing device.

10. The peripheral device of claim 1, wherein the communication module is to provide a descriptor of the external computing device to the computing device.

11. A computing system, comprising:
a processor; and
a peripheral device that is internal to the housing of the computing system, comprising:
a peripheral device processor; and
a sharing module to, upon execution of the peripheral device processor, allow the peripheral device to be shared with an external computing device over a network; and
a peripheral communication module to:
provide data from the peripheral device to a peripheral device hub module of the computing system notifying the computing system of operation of the internal peripheral by the external computing device; and
provide communication by the peripheral device with the external computing device.

12. The computing system of claim 11, wherein, when the peripheral device has commenced operation with the external computing device, the processor of the computing device operates at a low power state.

13. The computing system of claim 11, comprising a hard key associated with the peripheral device to indicate a sharing state with the external computing device.

14. The computing system of claim 11, comprising a display device wherein the display device visually presents to a user a shared state of the peripheral input device with the host computing device or external client computing device.

15. The computing system of claim 11, further comprising a display device, the processor to display a graphical user interface with sharing status of the peripheral device on the display device.

16. A method of sharing a peripheral device of a computing device, comprising:
exposing a peripheral device internal to the computing device as an independent peripheral usable by a different, external computing device as its peripheral; and
while the peripheral remains connected in the computing device, pairing the internal peripheral device with the external computing device for use by the external computing device, the pairing comprising
with a processor of the peripheral device:
executing a sharing module to allow the peripheral device to be shared over a network to the external computing device; and
transferring data to the computing device indicating the sharing status of the peripheral device with the external computing device.

17. The method of claim 16, further comprising unpairing the peripheral device form the external computer and sending data indicating that the peripheral device is to be reassociated with the computing device in which the peripheral device resides.

18. The method of claim 16, comprising, after receiving data indicating the sharing status of the peripheral device with an external computing device, encapsulating data from the peripheral device selected to be shared with the external computing device and transporting the encapsulated data to the external computing device.

19. The method of claim 16, further comprising displaying a graphical user interface on the computing device indicating a sharing status of the peripheral device with an external computing device.

20. The method of claim 18, wherein the encapsulating comprises using a header directing the data from the peripheral device to the external computing device.

* * * * *